United States Patent

Wyslouzil

[15] 3,644,881
[45] Feb. 22, 1972

[54] RECORDER FOR ACOUSTIC RANGING SYSTEM

[72] Inventor: Walter Wyslouzil, Ottawa, Ontario, Canada

[73] Assignee: Canadian Patents and Development Limited, Ottawa, Ontario, Canada

[22] Filed: Feb. 9, 1970

[21] Appl. No.: 9,702

[52] U.S. Cl. .............................. 340/6 R, 340/3 F, 340/16 R
[51] Int. Cl. ..................................................... H04b 11/00
[58] Field of Search ............................ 340/3 E, 3 F, 5, 6, 16

[56] References Cited

UNITED STATES PATENTS

| | | | |
|---|---|---|---|
| 2,326,880 | 8/1943 | Norrman | 340/16 X |
| 3,262,091 | 7/1966 | Richards | 340/3 F |
| 1,194,376 | 8/1916 | Furber, Jr. | 340/16 |
| 1,225,796 | 5/1917 | Fricke | 340/16 |

*Primary Examiner*—Richard A. Farley
*Attorney*—Weir, Marshall, MacRae & Lamb

[57] ABSTRACT

A sound ranging system in which coincident sound and radio pulses are emitted from a transmitting station. A receiving station is provided with a recorder having a stylus arm released for movement on reception of the radio pulse. A marking pulse is fed to the stylus on reception of the sound pulse, thereby providing an indication of the distance between the transmitting and receiving stations.

5 Claims, 3 Drawing Figures

RECORDER FOR ACOUSTIC RANGING SYSTEM

BACKGROUND OF THE INVENTION

This invention relates to improvements in recorders for use in sound ranging systems.

It is known to measure the distance between two points by determining the difference of arrival time at one of the points between a pulse of acoustical energy and a pulse of electromagnetic energy emitted substantially simultaneously from the other point. The system of the present invention is particularly useful in hydrographic surveying operations which employ a parent vessel having up to six side vessels moving on courses parallel to the parent vessel, spaced apart by about 300 feet. The parent vessel may be equipped with sophisticated and expensive devices to give an accurate measurement of its position. The indicating unit also provides a permanent record so that if a side vessel should err from its course, appropriate corrections can be made when the depth soundings are plotted. The term "sound pulse" is used to indicate acoustical energy and is not restricted to audible frequencies.

SUMMARY OF THE INVENTION

The invention relates to equipment useful in a sound ranging system, consisting of a control station emitting a sequence of coincident pulses of sound and electromagnetic energy and a satellite station determining the time interval between reception of these pulses. The receiving station includes a recorder having a stylus released on reception of the electromagnetic pulse to move at a constant known rate across a record sheet. On reception of the sound pulse, the stylus is energized to mark the record sheet, thereby indicating the time interval between reception of the pulses and thus the distance between the stations. The system of the present invention provides simple and inexpensive equipment which may be placed in the side vessels to determine their position relative to the parent vessel with acceptable accuracy.

DESCRIPTION OF THE PREFERRED EMBODIMENT

Figure 3:
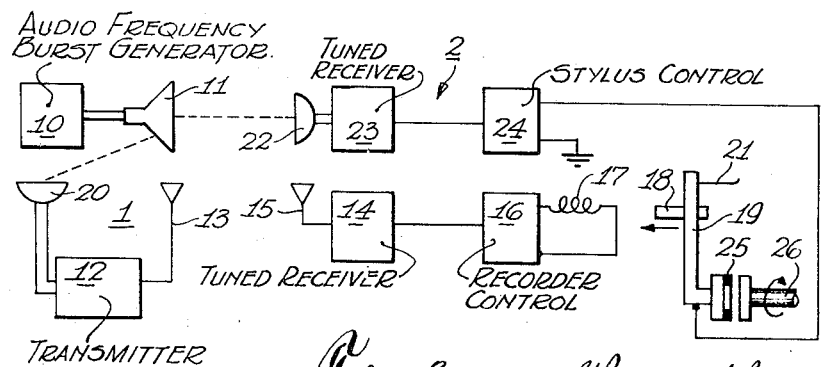
FIG. 3 is a schematic diagram of the overall system.

FIG. 3 is a schematic diagram of a ranging system in accordance with the present invention and useful in hydrographic surveying operations. The transmitting, or control station, generally indicated at 1 is placed on the parent vessel and the receiving, or satellite, station generally indicated at 2 is placed on each of the side vessels. The control station includes an audiofrequency burst generator 10 connected to a loudspeaker 11 to produce a series of short, high-intensity, sound bursts at a particular frequency. A conventional RT transmitter 12 having a microphone input 20 and a transmitting antenna 13 is located adjacent to loudspeaker 11.

The equipment at satellite station 2 consists of a recorder, which is described in greater detail below, with regard to FIGS. 1 and 2, in which a stylus 21 is moved across conductive recording paper. Stylus 21 is mounted on an arm 19 which is connected to a shaft 26 by a slip clutch 25. Shaft 26 is driven at a known constant speed by a drive motor 36 (FIG. 2). An armature 18 is movable under the influence of coil 17 between a first position restraining stylus arm 19 from rotation and a second position permitting rotation of the arm. Satellite station 2 also includes a conventional RT receiver 14 having an antenna 15. The output from receiver 14 is connected to a recorder control circuit 16 arranged to energize a coil 17 on reception of a signal pulse from transmitter 12. Coil 17 and armature 18 thus cooperate to form an electromagnetic actuator releasing stylus arm 19 for rotation when recorder control 16 is energized. Station 2 also includes a tuned audio receiver 23 receiving an input from a microphone 22. The output from receiver 23 is connected to a stylus control circuit 24 which is, in turn, connected to conductor stylus 21 via arm 19 to energize stylus 21 on reception of a sound burst by microphone 22.

It will be apparent that transmitting station 1 functions to emit substantially simultaneous pulses of sound and radiofrequency energy. For the distances involved, the transmission time of the radiofrequency energy to station 2 is extremely short and, hence, recorder arm 19 starts rotating substantially coincident with the production of the sound burst at loudspeaker 11. After a delay due to the finite velocity of propagation of sound, the sound burst is detected at station 2 and energizes stylus 21 to mark recording paper 27. Thus a measure of the distance between the control and satellite stations is marked on the recorder.

The signal from audiofrequency burst generator 10 is a 5 msec. duration pulse of 2 kHz. oscillation. The choice of particular frequency is governed by two considerations. The noise typically encountered on a ship in hydrographic survey operations decreases with increasing frequency and hence the higher frequencies give a better signal-to-noise ratio. The attenuation of sound in air, however, increases rapidly with frequency. A satisfactory compromise between these limitations is found at a frequency about 2 kHz. The choice of optimum pulse duration is also governed by two considerations. For maximum noise rejection in receiver 23, a very narrow band amplifier is desirable which, in turn, implies a long duration pulse. A long duration pulse, however, leads to ambiguous range indication and in practice a pulse duration of 5 msec. is chosen, corresponding to a receiver bandwidth of 200 Hz. For a maximum operating distance of about 1,000 feet, a repetition period of 1.2 seconds is chosen which allows time for sound to traverse this distance with additional time for synchronization of the system. Suitable correction tables for the variation in sound velocity caused by temperature changes and wind speed can be provided.

Loudspeaker 11 may be a standard 8-inch exponential horn having a 30 watt drive. The loudspeaker is suitably mounted to be directed towards the satellite stations. Transmitter 12 and receiver 13 may be conventional walkie-talkie type equipment. Microphone 22 may desirably be placed in a simple rectangular horn in order to enhance the noise rejection characteristics of the overall system. Such a horn provides an effective 3 db. beamwidth of 30° with a gain of 14 db.

In the preferred embodiment the audiofrequency burst generator consists of a continuously running oscillator whose output is gated to an amplifier circuit supplying power to the loudspeaker. Preferably the gating is accomplished by means of a separate multivibrator circuit. During initial setup of the system, it is preferable to emit a longer pulse and a convenient method of lengthening the pulse period is to insert additional capacitance in the multivibrator feedback loop.

Receiver 23 is a narrow band amplifier with a center frequency of 2 kHz. and a bandwidth of 200 Hz. Stylus control 24 includes a suitable amplifying stage to give sufficient signal level to mark conductive recording paper. The output from stylus control 24 is preferably taken from a step-up transformer.

The preferred form of recorder control circuit 16 has three 500 $\mu$f. capacitors connected in series with coil 17 and connected through a resistor to a 75 v. power supply. An SCR is connected across the capacitor and coil arrangement which is triggered into conduction by the pulse from receiver 14, thereby discharging the capacitors through coil 17 and retracting armature 18. The charging resistor then limits the current through the SCR to less than its holding current so that the SCR turns itself off, allowing the capacitors to charge up again.

Figure 1:
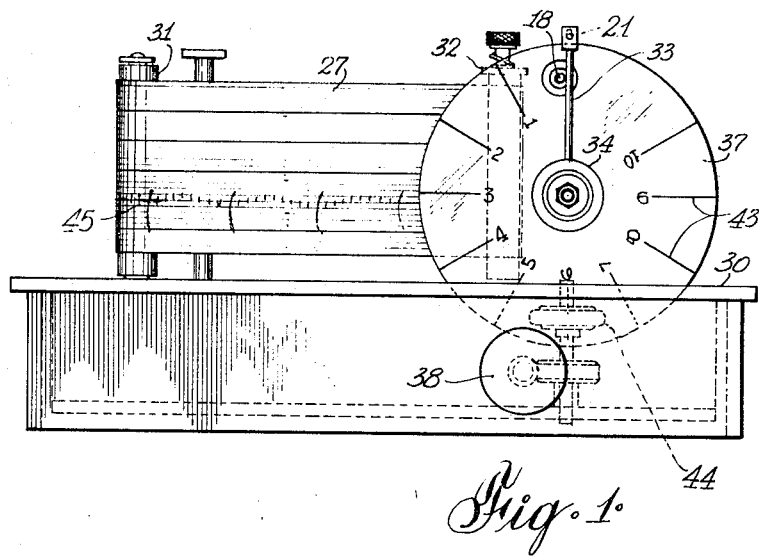
FIG. 1 is a front view of the recorder used in the system of the present invention.
Figure 2:
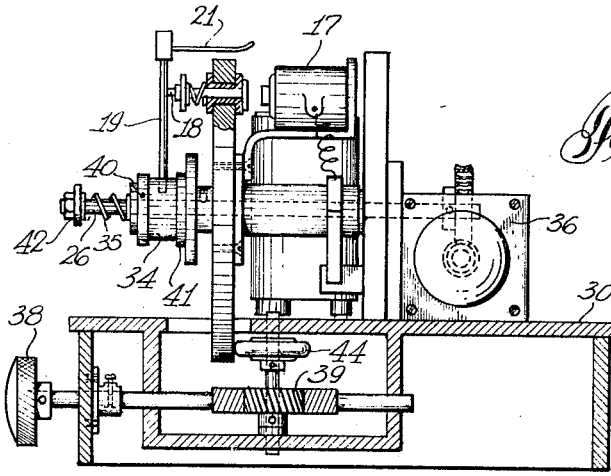
FIG. 2 is a view, in section, of the recorder.

The detailed structure of the recorder is shown in FIGS. 1 and 2. A base member 30 supports upright cylinders 31 and 32 carrying recording paper 27. Suitable paper drive means (not shown) are provided. Stylus arm 19 extends radially from a hub 34 mounted coaxially with, but free for relative rotation on, shaft 26. Shaft 26 is connected to and driven at a constant speed by electric motor 36. Slip clutch 25 is provided by friction disks 40 and 41 mounted on either side of hub 34, pressure between the various elements of the slip clutch being maintained by a spring 35 held in compression between a shaft collar 42 and disk 40. The assembly of coil 17 and actuating arm 18 is mounted on a large diameter disk or plate 37 which may be rotatably positioned with respect to the recording paper, thus altering the elapsed time of stylus arm rotation before crossing the paper. Preferably, calibration marks 43 are provided on disk 37. A handle 38 driving a disk engaging friction wheel 40 through a gear train 39 is provided to position the disk. Preferably, shaft 26 is driven at exactly 60 r.p.m. and stylus arm 19 is 2½ inches in length. The conductive recording paper has in effect a width of 3 inches representing a distance of 200 ft. Due to variations possible in the setting of disk 37, the centerline of the recording paper can represent any distance between 200 and 900 feet. The paper drive speed is relatively low, typically 0.6 inches per minute, just fast enough so that consecutive marks may be distinguished.

When receiver 14 detects the signal from transmitter 12 and enables control circuit 16 to energize coil 17, armature 18 which was restraining stylus arm 19 from rotation is withdrawn. The stylus moves in a counterclockwise direction as seen in FIG. 1, having a portion of its path across the recording paper. At the instant of reception of the sound burst, the stylus is energized and marks the paper as shown at 45. These marks give a measure of the distance of the satellite station from the master station. The stylus arm continues to rotate until it returns to abut on armature 18 until released on reception of the next pulse from transmitter 12. It will be realized that this form of display in fact provides integration of the received signal, performed visually, and thus aids in discrimination against the random noise inevitably present in the system. Any instantaneous indication of elapsed time such as would be provided by numerical display tubes would not provide this integrating effect.

Thus there has been described an efficient ranging system not requiring the use of complex components. It will be clear to those skilled in the art that variations from the exact embodiment disclosed can be made without departing from the inventive concept set out in the attached claims.

I claim:

1. In a ranging system having a control station emitting a sequence of coincident pulses of electromagnetic and acoustic energy and a satellite station receiving said pulses and determining the distance between said stations by measurement of the time interval between reception of corresponding electromagnetic and acoustic pulses, the improvement comprising: a recorder having a stylus mounted on an arm connected to a constant speed shaft by a slip clutch, a movable armature abutting said stylus and restraining it from movement; means responsive to reception of said electromagnetic signal to actuate said armature to release said stylus and, means responsive to reception of a sonic pulse to cause said stylus to mark said record sheet.

2. Apparatus according to claim 1 wherein said armature is adjustably mounted to alter the release position of said stylus.

3. Apparatus according to claim 2 wherein the armature and its actuating coil are mounted on a movable plate coaxial with said constant speed shaft.

4. Apparatus according to claim 1 wherein said pulses of electromagnetic and acoustic energy are about 5 milliseconds duration and said acoustic energy is at a frequency of about 2 kHz.

5. Apparatus according to claim 1 wherein said record sheet is conductive recording paper.

* * * * *

UNITED STATES PATENT OFFICE
CERTIFICATE OF CORRECTION

Patent No. 3,644,881      Dated February 22, 1972

Inventor(s) Walter Wyslouzil

It is certified that error appears in the above-identified patent and that said Letters Patent are hereby corrected as shown below:

On the cover sheet substitute the drawing figure:

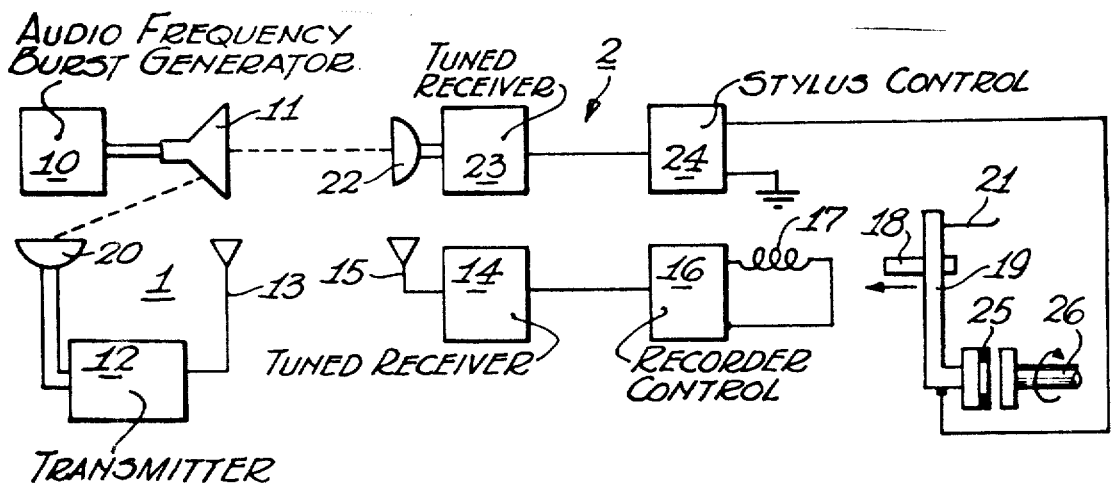

Signed and sealed this 27th day of February 1973.

(SEAL)
Attest:

EDWARD M. FLETCHER, JR.
Attesting Officer

ROBERT GOTTSCHALK
Commissioner of Patents